United States Patent
Grover et al.

(10) Patent No.: US 11,544,364 B2
(45) Date of Patent: Jan. 3, 2023

(54) AUTHENTICATION-BASED ON HANDHOLDING INFORMATION

(71) Applicant: MICRO FOCUS LLC, Santa Clara, CA (US)

(72) Inventors: Douglas Grover, Provo, UT (US); Lloyd L. Burch, Provo, UT (US); Michael F. Angelo, Houston, TX (US)

(73) Assignee: MICRO FOCUS LLC, Sanford, NC (US)

( * ) Notice: Subject to any disclaimer, the term of this patent is extended or adjusted under 35 U.S.C. 154(b) by 354 days.

(21) Appl. No.: 16/794,926

(22) Filed: Feb. 19, 2020

(65) Prior Publication Data
US 2021/0256100 A1 Aug. 19, 2021

(51) Int. Cl.
| | |
|---|---|
| G06F 21/32 | (2013.01) |
| G06F 21/34 | (2013.01) |
| G06N 5/04 | (2006.01) |
| G06N 20/00 | (2019.01) |
| G06V 40/12 | (2022.01) |

(52) U.S. Cl.
CPC .............. G06F 21/32 (2013.01); G06F 21/34 (2013.01); G06N 5/04 (2013.01); G06N 20/00 (2019.01); G06V 40/1371 (2022.01); G06V 40/1376 (2022.01)

(58) Field of Classification Search
CPC ........... G06F 21/32; G06F 21/34; G06N 5/04; G06N 20/00; G06V 40/1371; G06V 40/1376; G06V 40/45
See application file for complete search history.

(56) References Cited

U.S. PATENT DOCUMENTS

| | | | |
|---|---|---|---|
| 2013/0181902 A1* | 7/2013 | Hinckley | G06F 3/041 345/173 |
| 2015/0161368 A1* | 6/2015 | Stewart | G06F 21/32 726/19 |
| 2015/0161369 A1* | 6/2015 | Weksler | G06F 21/32 726/19 |
| 2017/0357440 A1* | 12/2017 | Tse | G06F 3/0482 |
| 2018/0011584 A1* | 1/2018 | Park | G06F 3/0488 |
| 2019/0050618 A1* | 2/2019 | Khuri-Yakub | A61B 5/02438 |
| 2019/0176730 A1* | 6/2019 | Choi | B60H 1/00742 |

FOREIGN PATENT DOCUMENTS

TW 200412544 A 7/2004

OTHER PUBLICATIONS

Russell Brandom, "Your phone's biggest vulnerability is your fingerprint", posted online on May 2, 2016, 4 pages. <https://www.theverge.com/2016/5/2/11540962/iphone-samsung-fingerprint-duplicate-hack-security>.

* cited by examiner

Primary Examiner — Premal R Patel

(57) ABSTRACT

An apparatus may include a processor that may be caused to access handholding information indicating a hand configuration in which the apparatus is being held and compare the handholding information with previously-stored handholding authentication data of an authentic user. The previously-stored handholding authentication data may represent an authentic configuration in which the apparatus is held by the authentic user. The processor may be caused to determine that the apparatus is being held by the authentic user based on the comparison and cause an authenticated action to occur based on the determination.

21 Claims, 9 Drawing Sheets

MACHINE-READABLE MEDIUM
500

ACCESS HANDHOLDING INFORMATION, THE HANDHOLDING INFORMATION INDICATING A LOCATION OF A PLURALITY OF SIMULTANEOUS POINTS OF CONTACT WITH AN APPARATUS INDICATIVE OF A WAY IN WHICH THE APPARATUS IS BEING HELD
502

COMPARE THE HANDHOLDING INFORMATION WITH PREVIOUSLY-STORED HANDHOLDING AUTHENTICATION DATA
504

DETERMINE A THRESHOLD MATCH BETWEEN THE HANDHOLDING INFORMATION AND THE PREVIOUSLY-STORED HANDHOLDING AUTHENTICATION DATA BASED ON THE COMPARISON
506

CAUSE AN AUTHENTICATED ACTION TO OCCUR BASED ON THE THRESHOLD MATCH
508

*FIG. 5*

AUTHENTICATION-BASED ON HANDHOLDING INFORMATION

BACKGROUND

An apparatus such as a smartphone may be unlocked or otherwise accessed based on various authentication techniques to authenticate a user. For example, the apparatus may authenticate the user based on verification of a Personal Identification Number (PIN) or biometric information such as a fingerprint or facial features.

BRIEF DESCRIPTION OF THE DRAWINGS

Features of the present disclosure may be illustrated by way of example and not limited in the following figure(s), in which like numerals indicate like elements, in which:

FIG. 5 depicts a block diagram of an example non-transitory machine-readable storage medium of authenticating a user based on handholding information.

DETAILED DESCRIPTION

Figure 1:
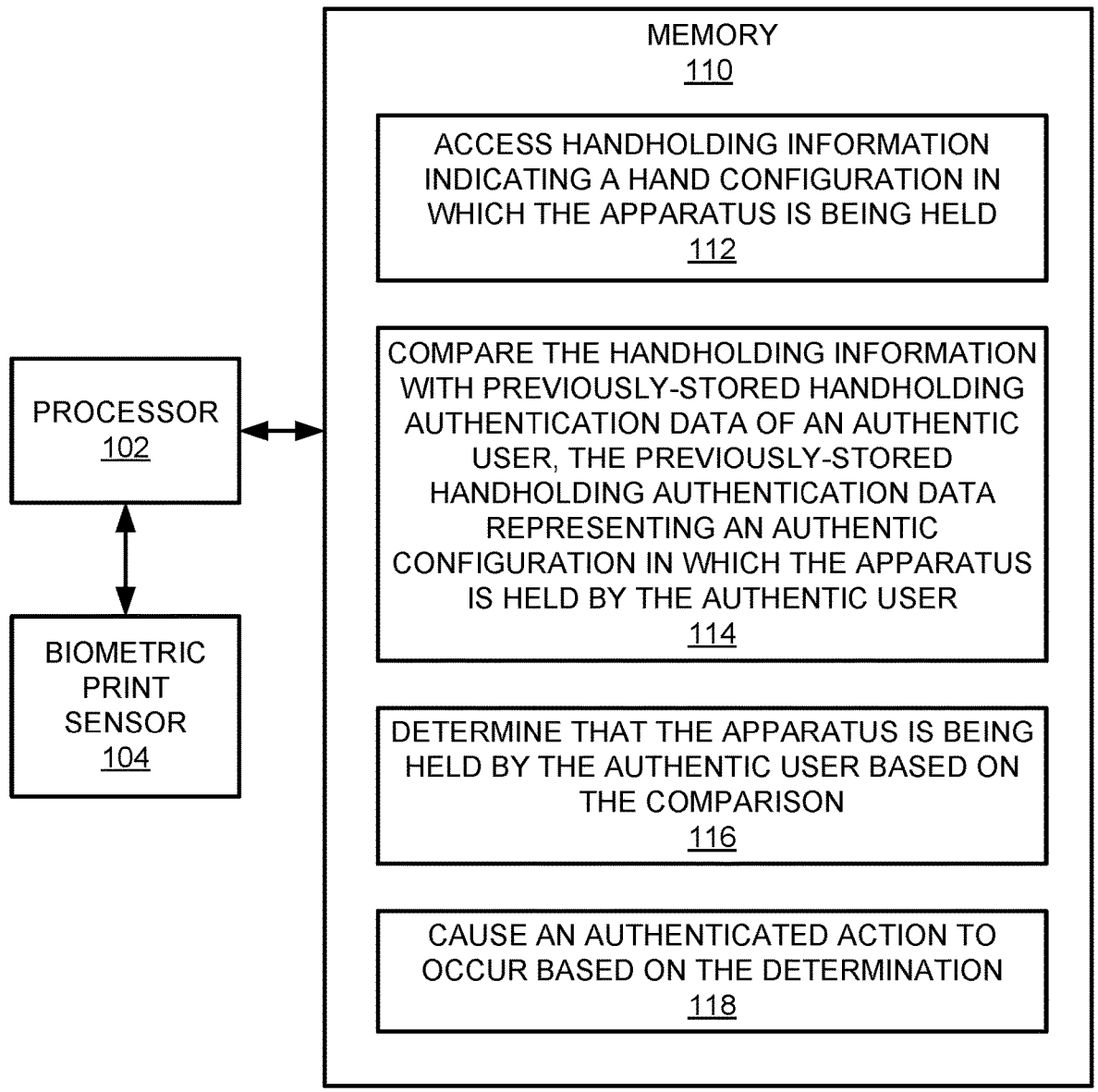
FIG. 1 depicts a block diagram of an example apparatus that may authenticate a user based on handholding information.

For simplicity and illustrative purposes, the present disclosure may be described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" may be intended to denote at least one of a particular element. As used herein, the term "includes" means includes but not limited to, the term "including" means including but not limited to. The term "based on" means based at least in part on.

Authentication techniques may present security risks or other issues. For example, PIN-based authentication may be burdensome for the user to continually input and may result in deactivation of such security or writing down the PIN so that the PIN is not forgotten. Furthermore, a fingerprint may be circumvented based on photos of a fingerprint or use of a user's finger while the user is incapacitated. Facial recognition may be similarly compromised.

Disclosed herein are apparatuses and methods to authenticate a user based on the way in which the user holds an apparatus, which may improve the security of the apparatus and/or functions of the apparatus. For example, an apparatus may be improved to use a hand configuration that indicates the way in which a person holds an apparatus as a form of authentication. The hand configuration may reflect a recognizable way that a user holds the apparatus and may be unique to each user.

For example, a first user may hold the apparatus with a left hand with a thumb on the top left side of the apparatus along with part of the palm of the hand below the thumb extending to the bottom of the apparatus. On the right side of the apparatus, the user may have four fingers that are touching the right side of the apparatus. A second user may hold an apparatus with a thumb on the right side in the middle of the apparatus with the side of the thumb going down to the bottom of the right side of the apparatus. The second user may place two fingers that typically touch the left side on the bottom of the mobile device and may place two fingers on the back of the mobile device.

In some examples, an authentic configuration that represents the way in which a user holds the apparatus may be learned over time through machine-learning techniques and/or the user may register a specific hand configuration. In some examples, the hand configuration may be represented by handholding information that may include or otherwise use handholding authentication data. The handholding authentication data may include biometric print sensor data (such as fingerprints, fingerprint slices, palm prints, palm print slices), location information (to indicate hold positions), pressure input, angular incident information, and/or other information to uniquely identify a user.

In some examples, the authentication process may be based on a threshold match of the handholding information to previously determined and stored handholding authentication data. If the threshold is not met, additional authentication may be required, such as a PIN/password, facial recognition, voiceprint, and/or the like. In some examples, the additional authentication may be used in combination with the threshold match of the handholding information.

In some examples, the apparatus may execute a security action such as locking the apparatus if the apparatus is handed to a second user because the hand configuration from the second user may not be authenticated. For example, if the authenticated user puts down the apparatus while the apparatus is unlocked, and another user picks up the apparatus, the apparatus may lock itself to prevent access by the second user. In some examples, the apparatus may use an activity timeout period/pass parameter so that the authenticated user can pass the apparatus to the second user without automatically locking out the second user.

In some examples, the authentication process may operate over time and/or with multiple hand configurations. For example, when a user holds the apparatus, a left thumb may be on the right side and four fingers may be on the left side until the user repositions the grip on the apparatus. Alternatively, the user may pick up the apparatus with a right hand and then hand the apparatus to the user's left hand. The foregoing combination of both hands (e.g., fingerprint slices from both hands) may be used to meet the threshold for authenticating the user. In one example, the authentication process may include authentication of multiple hand configurations. For example, the user may be authenticated when the user holds the apparatus in either of the manners described above (e.g., in both hands/same hand, but reverse patterns) before being authenticated.

In some examples, the authentication process may use location information that indicates locations of where the user is holding the apparatus in conjunction with the biometric print sensor data. For example, the location of a thumb print may be compared to an authenticated location of a thumb print along with any other locations of other biometric print sensor data for authentication.

In some examples, the authentication process may use the location information without the biometric print sensor data. This authentication process may be combined with additional (second-factor) authentication. In some examples, pressure information indicating how tightly the user holds the apparatus may be used in conjunction with the location information for authentication. In some examples, the authentication process may be used to determine patterns of how the user interacts with different applications associated with the apparatus. For example, the user may have a different hand configuration for using a texting application versus a camera application. The learned hand configuration may be used with other factors, such as the angle of the mobile device/app usage, etc., (via on-board sensors such as gyroscopes) when the user is interacting with the application to authenticate the user.

In some examples, the authentication process may use the top, back, and/or front of the mobile device as additional places that could detect biometric prints. For example, if a user's finger is touching the back of the apparatus, the apparatus may use the fingerprint as part of the authentication process along with the fingerprints/palm print slices on the side of the apparatus. The fingerprint/palm print may be detected as they wrap around the edges of the apparatus, such as when the apparatus includes a waterfall screen or otherwise includes sensors on the edges (or sides) of the apparatus. In some examples, the back of the apparatus may only use touch locations and the sides may use fingerprints and/or location.

In addition to the location information discussed above, the hold pattern information may include angle and/or position information of where the sides of the apparatus are in relation to the biometric prints. A user may have a different hold angle when the thumb and fingers are touching the side (or back) of the apparatus as compared to another user. For example, a first user may hold their thumb at a 25-degree angle in relation to the edge of the mobile device versus a second user who typically holds their thumb in parallel to the edge of the apparatus. In addition, or alternatively, a position of the finger/thumb in relation to the edge of the apparatus may be used. For example, while the first and second users both hold the apparatus in similar locations, the first user may hold the apparatus using the first finger more towards the first finger joint than a second user who holds the apparatus with the tip of the finger.

In some examples, the apparatus may authenticate multiple users. In these examples, the authentication process may authenticate hand configurations of multiple users. In some of these examples, a first user may be granted different permissions than a second user when using the same apparatus based on their respective hand configurations. In some examples, the authentication process may be done locally on the apparatus or using a back-end service. For example, the hand configurations may be locally encrypted. Alternatively, the hand configurations may be verified via an authentication server/service (in communication with the apparatus) using encryption.

In some examples, the authentication process may use a PIN based on pressure information. For example, referring to FIG. 2A, fingers 201A-E and the fingerprint slices detected from the fingers 201A-E may be used in conjunction with a pressure-based PIN number. For example, a user may enter a PIN code after holding the apparatus 100 and/or after biometric print sensor data authenticated by placing more pressure on a first finger (201A), then a second finger (201B), then a third finger (201C), and then a fourth finger (201D) to input a PIN of 1-2-3-4 respectively corresponding to fingers 201A,B,C,D. In this example, each finger 201A-D may correspond to a portion of the PIN or other secret credential. In some examples, the pressure information may include combinations of finger pressure. For example, the user may apply more pressure for first and second fingers at the same time and apply pressure for the third finger and then the fourth finger.

In some examples, the pressure-based PIN may be associated with a fingerprint slice or other biometric print sensor data for enhanced security. For example, when a user holds the apparatus in an authentic configuration, the fingerprint slices may be required to match, and the appropriate pressure PIN code sequence may have to be entered using the correct fingers for authentication.

The authentication process may be used in various contexts to cause different types of authenticated actions (in addition to or instead of locking/unlocking an apparatus). For example, the authenticated actions may include accessing the features of a smart house, accessing a realtor lockbox, authenticating credit card or payment transactions, and/or the like.

FIG. 1 depicts a block diagram of an example apparatus 100 that authenticates a user based on handholding information. The apparatus 100 shown in FIG. 1 may be a computing device, such as a "smartphone," or other device that may authenticate a user as described herein. As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), and/or other suitable hardware device. Although the apparatus 100 has been depicted as including a single processor 102, it should be understood that the apparatus 100 may include multiple processors, multiple cores, or the like, without departing from the scope of the apparatus 100 disclosed herein.

The apparatus 100 may include a memory 110 that may have stored thereon machine-readable instructions (which may also be termed computer readable instructions) 112-118 that the processor 102 may execute. The memory 110 may be an electronic, magnetic, optical, or other physical storage device that includes or stores executable instructions. The memory 110 may be, for example, Random Access memory (RAM), an Electrically Erasable Programmable Read-Only Memory (EEPROM), a storage device, an optical disc, and the like. The memory 110 may be a non-transitory machine-readable storage medium, where the term "non-transitory" does not encompass transitory propagating signals. It should be understood that the example apparatus 100 depicted in FIG. 1 may include additional features and that some of the features described herein may be removed and/or modified without departing from the scope of the example apparatus 100.

The apparatus 100 may include a biometric print sensor 104 that may detect biometric print features. A biometric print feature may refer to an anatomical, usually skin, feature that may be unique to a user, alone or in combination with other biometric print features. Examples of biometric print features include minutiae information (which may comprise scar information and/or age line information), friction ridge information, pore information, skin tone, and/ or other features. As will be described with reference to FIGS. 3A and 3B, in some examples, the biometric print features may include pad-based biometric print features that include biometric print features of a pad of a finger and/or non-pad-based biometric print features. The non-pad-based biometric print features may include biometric print features of a palm and/or a portion of a finger other than the pad.

In some examples, the biometric print sensor 104 may include a whole-screen display sensor that may read biometric print features throughout a display screen of the apparatus 100. In some examples, the biometric print sensor 104 may read only a portion of the display screen (detection zone), in which case the way in which the user holds the apparatus 100 may be authenticated when the user holds the apparatus 100 within the detection zone. In some examples, the biometric print sensor 104 may also, or instead, read biometric print features from a reverse side of the screen (such as a backside of the apparatus 100).

In some examples, the display screen may include a waterfall screen in which the screen extends to the sides of the apparatus 100. In these examples, the biometric print sensor 104 may read biometric print features from the sides of the apparatus 100. In some examples, the apparatus 100 may include display screens on both the front and back side of the apparatus 100, in which case the biometric print sensor 104 or another biometric print sensor may read biometric print features from either or both sides.

In some examples, the biometric print sensor 104 may include an optical sensor, an acoustic sensor, and/or other type of biometric print sensor. An optical sensor may capture light directed to and reflected from a body part to generate an image of the body part (and therefore biometric print features of the body part). One example of such an optical sensor may include the CLEAR ID™ sensor from SYNAPTICS™ of San Jose, Calif., although other optical sensors may be used. An acoustic sensor may emit acoustic sound waves, which may be ultrasonic sound waves, that may be reflected back from a body part. The reflected sound waves may be mapped to form a three-dimensional map of a body part (and therefore biometric print features of the body part). One example of such an acoustic sensor may include the 3D SONIC SENSOR™ from QUALCOMM™ of San Diego, Calif.

Depending on a way in which a user holds the apparatus 100 with a user's hand, the biometric print sensor 104 may detect fingers, palms, or portions thereof and generate biometric print sensor data based on the detected fingers, palms, or portions thereof. In some examples, the biometric print sensor data may include a fingerprint, a fingerprint slice, a palm print, a palm print slice, and/or other data that may be used to uniquely identify a user based on biometric print features. Thus, a fingerprint, fingerprint slice, palm print, palm print slice, and/or other biometric data may each include biometric print sensor data generated from one or more biometric print features detected from a body part (or portion thereof) such as a finger or palm.

As used herein, a fingerprint may refer to biometric print sensor data generated based on detection of a finger (which may include a thumb), usually based on a pad of a finger.

Accordingly, a fingerprint feature may relate to biometric print features of a finger that may be used to uniquely identify the user. As will be described in more detail with respect to FIG. 3C, a biometric print slice may refer biometric print sensor data generated based on detection of a portion of a body part where such portion is smaller than the all of the body part available for user identification. For example, a fingerprint slice may refer to biometric print sensor data generated based on detection of a portion of a finger where such portion is smaller than all of the finger available to uniquely identify the user. A given fingerprint slice based on a finger may therefore represent only a subset of fingerprint features that would be represented in a fingerprint or other biometric print features for the same finger. Thus, a fingerprint slice may include fingerprint features at any portion of the finger, including the finger pad.

In some examples, a fingerprint slice may be detected from a portion of a finger that is generated based on contact with a side portion of the apparatus 100 (such as on a waterfall portion of the screen 220). In these examples, the portion of the finger in contact with the side portion may be detected to generate the fingerprint slice. In some examples, a fingerprint slice may refer to a portion of a fingerprint that is generated based on contact with a front portion of the apparatus 100 (such as on a front portion of the screen 220). In these examples, the fingerprint slice may be generated based on a portion of a finger pad, for example, that may contact the front portion. In some examples, a fingerprint slice may refer to a portion of a fingerprint that is generated based on contact with a back portion of the apparatus 100 such as on a back portion of the apparatus 100. In some of these examples, the back portion may itself include a touchscreen.

The term "palm print" may refer to biometric print sensor data generated based on detection of a palm. Accordingly, a palm print feature may include biometric print features of a palm that may be used to uniquely identify the user. The term palm print slice may be similar to a fingerprint slice, except that the palm print slice relates to a palm.

Figure 2A:
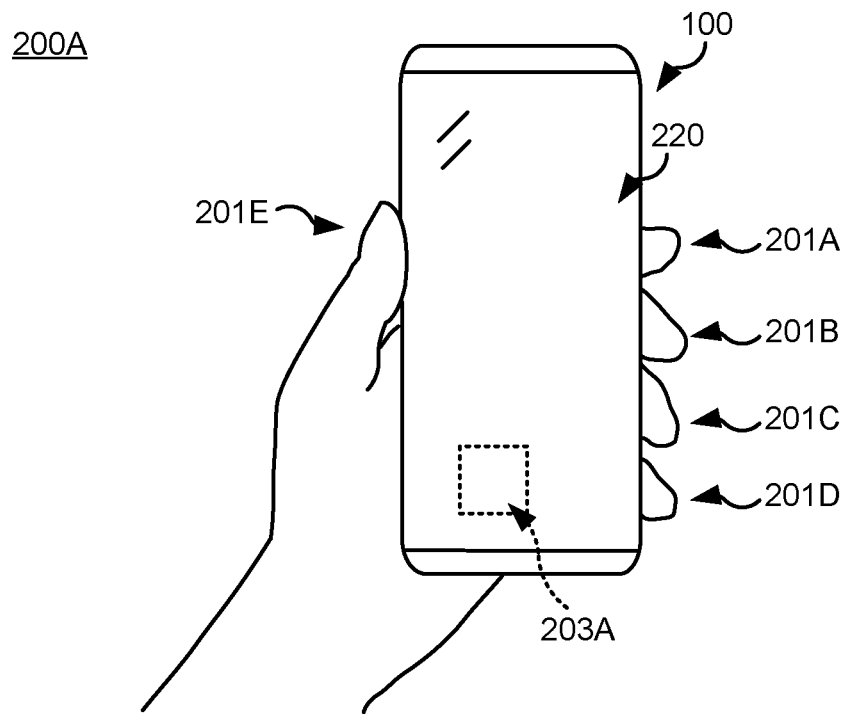
FIG. 2A depicts an example of a left-handed hand configuration.
Figure 2B:
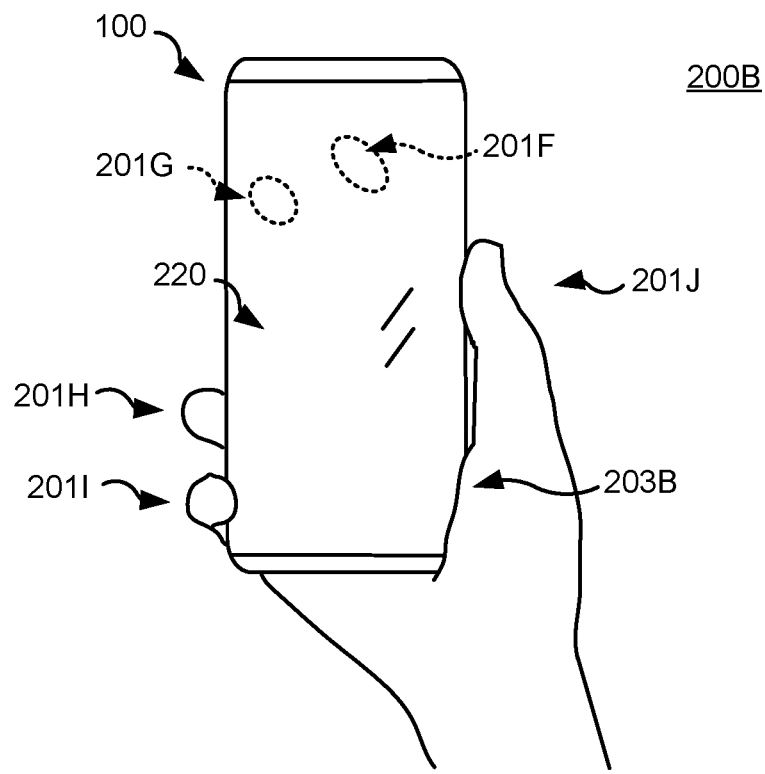
FIG. 2B depicts an example of a right-handed hand configuration.
Figure 2C:
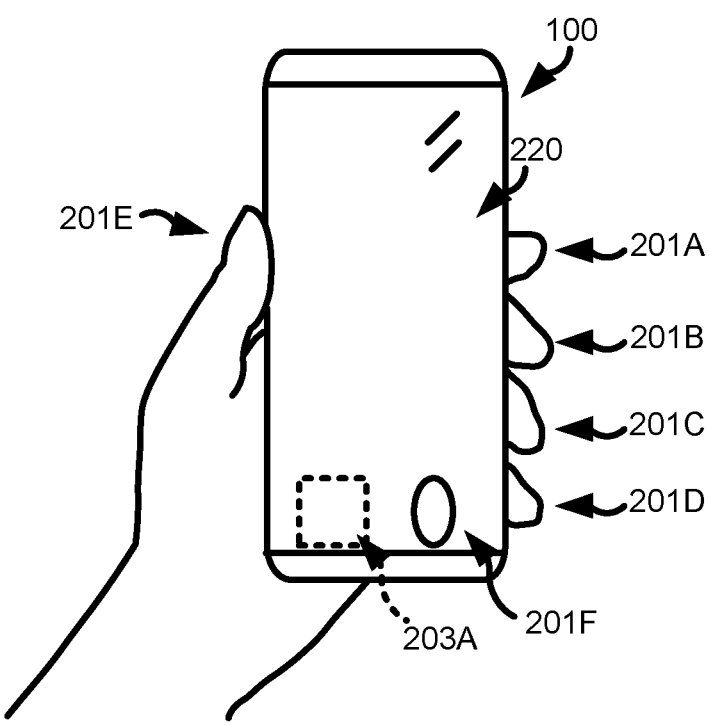
FIG. 2C depicts an example of the left-handed hand configuration illustrated in FIG. 2A with additional right-hand authentication.

To illustrate hand configurations, FIGS. 2A, 2B, and 2C respectively depict an example of a left-handed hand configuration 200A, a right-handed hand configuration 200B, and a left-handed hand configuration 200A with additional right-hand authentication. The apparatus 100 may generate fingerprints, fingerprint slices, palm prints, palm print slices, and/or other biometric print sensor data that reflect the various hand configurations. It should be noted that the particular hand configurations illustrated in these figures are provided for illustrative purposes. Other hand configurations may be used as well.

Referring to FIG. 2A, the left-handed hand configuration 200A may include a user holding apparatus 100 with various fingers 201 (illustrated as fingers 201A-E, in which a thumb is considered a "finger" 201). A screen 220 of the apparatus 100 is shown for orientation purposes. The screen 220 may include a touchscreen or other display device. In some examples, the screen 220 may be configured as a "waterfall" screen in which the screen flows down the sides of the apparatus 100. Although not shown for illustrative purposes, the waterfall screen may also be on the top and/or bottom of the apparatus 100. In these and other examples in which the biometric print sensor 104 may detect biometric prints from the top and/or bottom portion of the apparatus 100, a handholding configuration may include biometric print sensor data based on contact with the top and/or the bottom of the apparatus 100. In any event, the fingers 201 or portions thereof may contact the screen 220. In the example shown, a user may hold the apparatus 100 with the user's left hand using five fingers 201 in the left-handed hand configuration 200A.

In some examples, a palm 203 and/or additional finger portions thereof may be detected on the screen 220 and/or other portion of the apparatus 100, such as on the backside, top, bottom, and/or other portion of the apparatus 100 detectable by the biometric print sensor 104. As used herein, the term "palm 203" will refer to a portion or all of a palm, such as palm 203A in relation to the left hand or palm 203B in relation to the right hand. In various figures, the palm 203(A,B) may be depicted using a solid or dashed outlined box for clarity only and is not meant to delimit the boundaries of the illustrated palm 203 unless otherwise noted. In some examples, the biometric print sensor 104 may detect the palm or portion thereof and generate a palm print and/or palm print slice. A palm print slice may be similar to a fingerprint slice except that the palm print slice relates to a detection of a portion of the palm.

In some examples, a biometric print may be detected at multiple portions or sides of the apparatus 100. For example, a finger may contact the side portion and wrap around to the screen 220, in which case a fingerprint may be generated based on the wrapping contact. In some of these examples, an indication of a location of the wrapping may be stored in connection with the fingerprint to be able to account for the wrapping. For example, a given fingerprint may be distorted at the point of wrapping compared to if the fingerprint was detected from a straightened (non-wrapped) finger.

FIG. 2B shows an example of a right-handed hand configuration 200B. In this example, a user may hold the apparatus 100 with the user's right hand with fingers 201H-J (again, where the thumb is considered a "finger" 201) touching the screen 220. In this example hand configuration, the user may contact the backside (opposite the screen 220) of the apparatus 100 with fingers 201F and 201G. In some of these examples, the biometric print sensor 104 may generate fingerprints or fingerprint slices for fingers 201F and 201G. Also in this example, a palm 203B or portion thereof may contact the apparatus 100 at the screen 220 and/or the backside of the apparatus 100. The biometric print sensor 104 may generate palm print or palm print slice based on the palm 203B.

In some examples, user authentication described herein may include authenticating a hand configuration with additional authentication. For example, as shown in FIG. 2C, a user's left-handed hand configuration 200A may be authenticated in combination with a fingerprint authentication based on a finger 201F from the user's right hand (and/or vice versa).

Figure 3A:
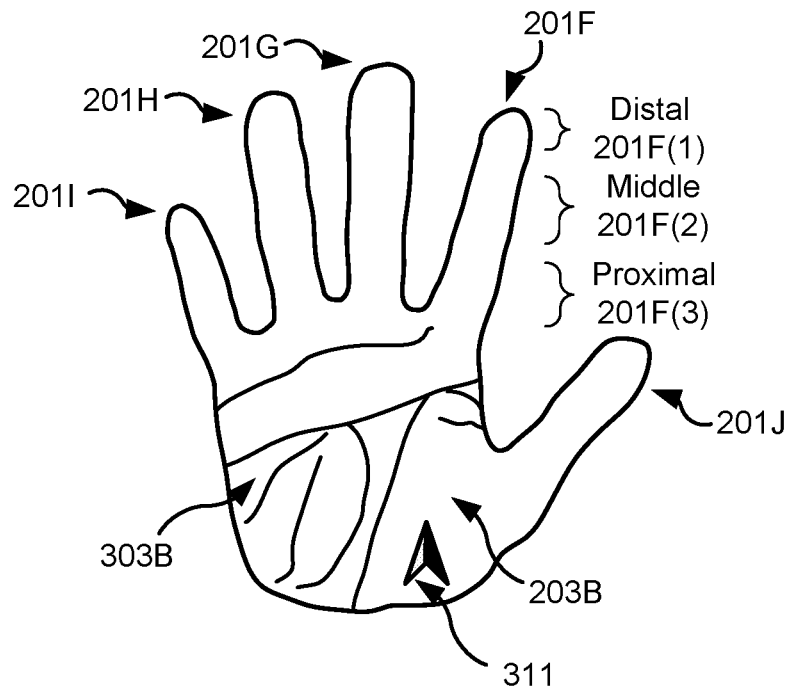
FIG. 3A depicts an example of portions of a finger and a palm print area of a right hand involved in the right-handed hand configuration illustrated in FIG. 2B.
Figure 3B:
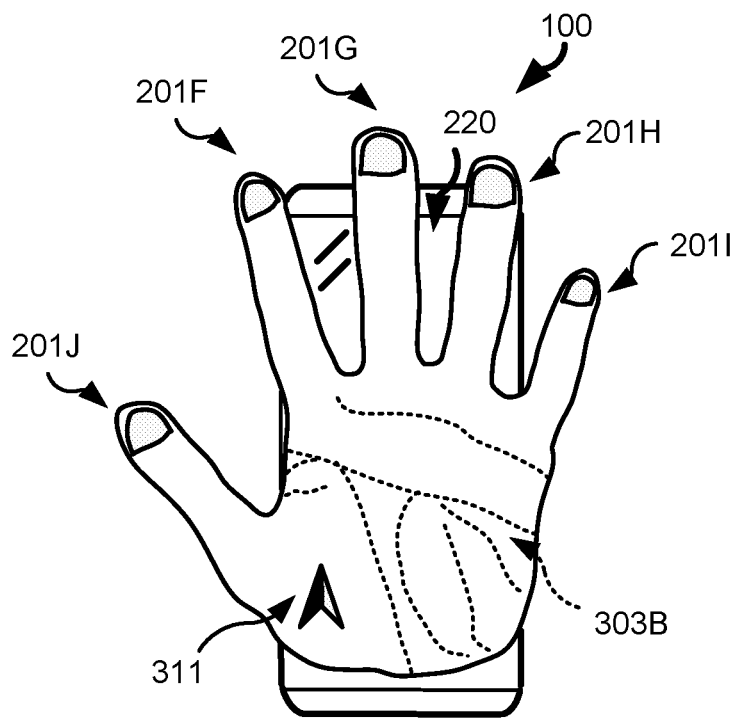
FIG. 3B shows an example of generation of a baseline registration image of non-pad-based biometric print features of the right hand illustrated in FIG. 3A.
Figure 3C:
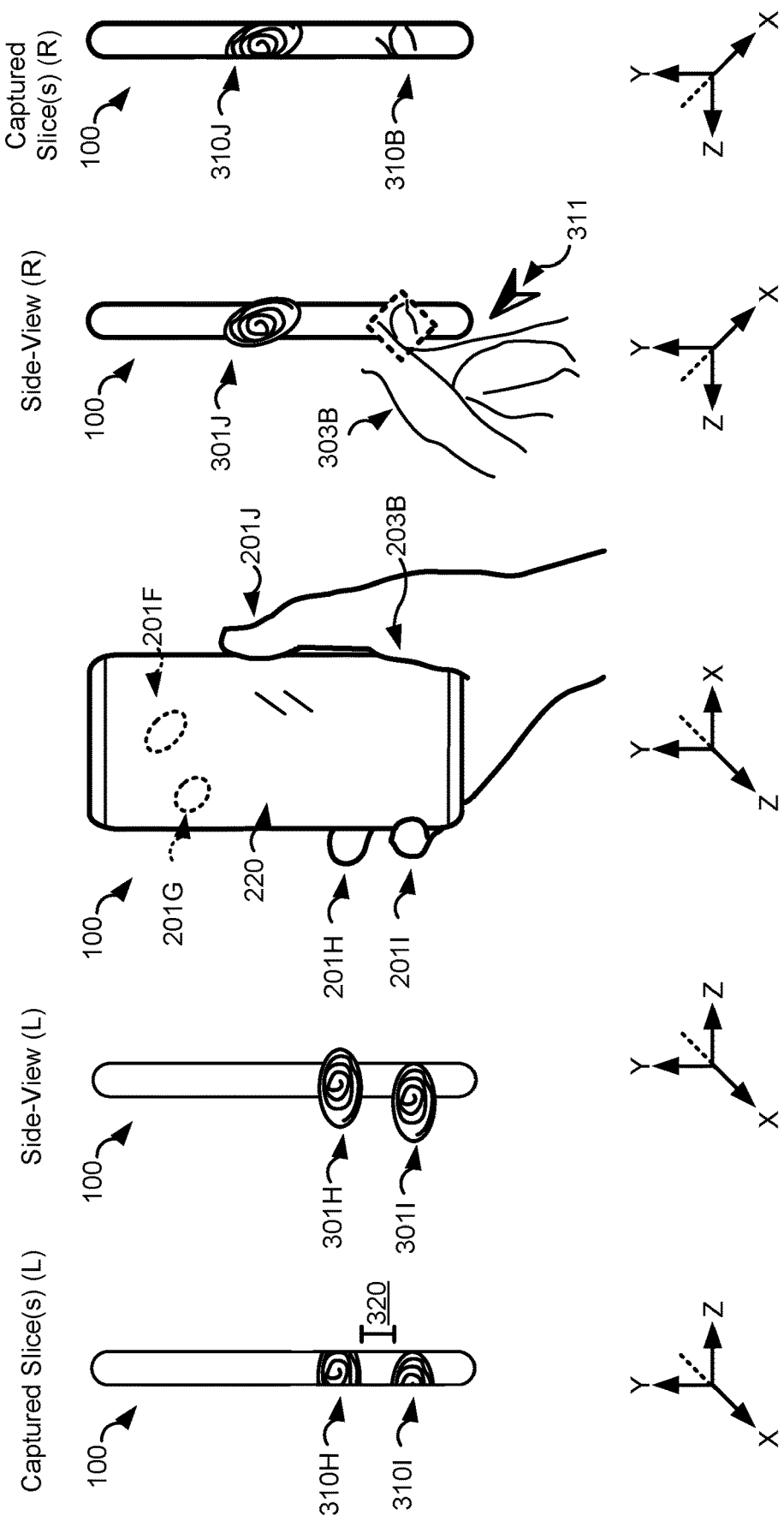
FIG. 3C depicts an example of biometric print slices based on the right-handed hand configuration illustrated in FIG. 2B.

Having described examples of hand configurations, attention will now turn to a discussion of portions of a finger, a palm, non-pad-based registration, and biometric print slices. FIG. 3A depicts an example of portions (1)-(3) of a finger 201F and a palm 203B of a right hand involved in the right-handed hand configuration illustrated in FIG. 2B. FIGS. 3A-3C include a rotational indicator 311 to show rotational orientation of the biometric print features illustrated in these figures. The finger 201F may include a distal portion 201F(1) (illustrated as distal 201F(1)), a middle portion 201F(2) (illustrated as middle 201F(2)), and a proximal portion 201F(3) (illustrated as proximal 201F(3)). It should be noted that each of the fingers 201A-J may include similar portions (1)-(3). Furthermore, each of the portions (1)-(3) may be delineated based on joints between the portions (1)-(3). While various examples may describe portions 201(F)(1)-(3), these examples are applicable to other portions (1)-(3) of other fingers 201 as well.

The distal portion 201F(1) may include the finger pad, which may include pad-based biometric print features. The pad-based biometric print features may include fingerprint features of a finger pad that have been used for ink-based fingerprint identifications. In some examples, the pad-based biometric print features may include fingerprint features that may identify a core of a fingerprint.

On the other hand, the middle portion 201F(2) and the proximal portion 201F(3) may not have pad-based biometric print features. The middle portion 201F(2) and the proximal portion 201F(3) may instead include other biometric print features of the finger 201F that may not indicate a core of a fingerprint and are not at the distal portion 201F(1). Likewise, the palm 203B may not have pad-based biometric print features and may instead include biometric print features of the palm 203B (where such features are illustrated as palm print features 303B) that may not indicate a core of a fingerprint. In this sense, the palm 203 together with the middle portion 201(J)(2) and proximal portion 201(J)(3) may include non-pad-based biometric print features while the distal portion 201F(1) may include pad-based biometric print features. It should be noted that a given fingerprint slice may include some or all of the distal portion 201(J)(1), the middle portion 201(J)(2), and/or the proximal portion 201(J)(3). Likewise, a given palm print slice may include all or some of the palm 203B.

Depending on the way in which a user holds the apparatus 100 (such as the handholding configurations illustrated in FIGS. 2A-2C), the biometric print sensor 104 may detect the distal portion 201(F)(1), the middle portion 201(F)(2), the proximal portion 201(F)(3), any similar portions of other fingers 201A-J, and/or palms 203 (such as palm 203B) to generate fingerprints, fingerprint slices, palm prints, palm print slices, and/or other biometric print sensor data. In this sense, a given fingerprint may include biometric print features from the distal portion 201(F)(1), the middle portion 201(F)(2), and/or the proximal portion 201(F)(3) (or similar portions of other fingers 201). Likewise, a given palm print may include biometric print features from various or all portions of a palm 203.

In some examples, the apparatus 100 may generate a baseline registration image of non-pad-based biometric print features such as the palm print features 303B, the biometric print features of middle portion 201(F)(2), the biometric print features of proximal portion 201(F)(3), and/or other body part other than the finger pad at distal portion 201F(1). For example, FIG. 3B shows an example of generation of a baseline registration image of non-pad-based biometric print features of the right hand illustrated in FIG. 3A. In this example, the biometric print sensor 104 (not shown in FIG. 3B) may generate an image of the non-pad-based biometric print features, which may include fingerprint features of portions of fingers 201 other than the distal portions (such as 201(F)(1), palm print features 303B (shown in dashed line to indicate contact between a reverse side of the illustrated top-view of the right hand with the screen 220), and/or other biometric print features other than at the distal portion of a finger 201.

It should be noted that the baseline registration image may refer to an optical image such as from an optical type of biometric print sensor 104, an acoustic image (or mapping) from an acoustic type of biometric print sensor 104, and/or other type of image generated by other types of biometric print sensors 104. It should be further noted that the apparatus 100 may generate multiple baseline registration images, where each baseline registration image may cover a respective portion of a corresponding hand or other body part.

Having described examples of handholding configurations, biometric print features, and registration of these features for authentication matching, attention will now turn to an example of biometric print slices that may be used to determine handholding configurations. For example, FIG. 3C depicts an example of biometric print slices based on the right-handed hand configuration illustrated in FIG. 2B. In FIG. 3C, an XYZ axis legend is shown for clarity, and also serves as a reference point for the rotational indicator 311. Fingers 201H and 201I may contact a side of the apparatus 100. Referring to the Captured Slice(s) (L) and Side-View (L), schematically shown is an overlay of pad-based fingerprint 301H corresponding to finger 201H and pad-based fingerprint 301I corresponding to finger 201I that would have been detected if the entire portion of fingers 201H and 201I corresponding to the pad-based fingerprints 301H and 301I had read by the biometric print sensor 104. Because only a portion of each finger 201H and 201I respectively corresponding to a pad-based fingerprint 301H and 301I may contact the apparatus 100, only a fingerprint slice 310H and 310I are respectively generated based on the portions that contact the apparatus. It should be noted that only a portion of a given finger 201 may contact the front side of the screen 220 whether or not the finger 201 contacts the side of the screen 220, in which case a corresponding fingerprint slice 310 may be generated for that portion. In other words, in some examples, biometric print data (such as a fingerprint, fingerprint slice, palm print, palm print slice, etc.) may be generated based on detection with the front side, top side, bottom side, left side, right side, and/or reverse (back) side of the apparatus 100 so long as the biometric print sensor 104 is able to detect such biometric print features of a body part.

Referring to the Captured Slice(s) (R) and Side-View (R) schematically shown is an overlay of pad-based fingerprint 301J corresponding to finger 201J that would have been detected if the entire portion of the pad-based fingerprint of finger 201J had read by the biometric print sensor 104. Because only a portion of the finger 201J corresponding to a pad-based fingerprint 301J may contact the apparatus 100, only a fingerprint slice 310J may be respectively generated based on the portions that contact the apparatus 100. Likewise, schematically shown is an overlay of palm print features 303B corresponding to palm 203B if the entire portion of the palm 203B had read by the biometric print sensor 104. Because only a portion of the palm 203B corresponding to the palm print features 303B may contact the apparatus 100, only a palm print slice 310B may be generated based on the portions that contact the apparatus 100.

It should be noted that the way in which a user holds the apparatus 100 may be different than the way in which the user contacts the apparatus 100 to generate a baseline reference image. For example, the palm print features 303B of the baseline reference image generated based on the contact shown in FIG. 3B may be rotated and horizontally flipped to create a mirror image as shown in the Side-View (R) of FIG. 3C. The rotation may result from the way in which a user may rotate a hand to hold the apparatus 100 relative to the hand position during registration. Furthermore, the flipping may account for the user holding the apparatus 100 at the reverse (backside) of the screen 220 instead of laying the palm down on top of the screen 220 during registration. As such, the apparatus 100 may accordingly flip and/or rotate the baseline reference image and/or for matching with non-pad-based biometric print data such as palm print slice 310B and/or non-pad-based fingerprints or slices.

In some examples, the pad-based fingerprints of fingers 201F and 201G may be generated as well, in which case these pad-based fingerprints may be added to the handholding information (whether during a registration process to generate and store handholding authentication data or to generate current handholding information to be matched against previously-stored handholding authentication data). In this way, the handholding information may include biometric prints, biometric print slices (such as fingerprint or palm print slices), and/or other information that indicates a handholding configuration. An example of such matching will be described with reference to FIG. 7.

In some examples, in addition to or instead of the fingerprint slices 310H, 310I, 310J, or palm print slice 310B, the handholding authentication data may include location information indicating a plurality of locations at which a respective finger 201 or palm 203 contacts the apparatus 100, angular incident information that indicates an angle at which a finger or palm is in contact with the apparatus 100, and/or pressure information. For example, the apparatus 100 may authenticate (with or without the biometric print sensor data) the user based on the location information, the angular incident information, and/or the pressure information.

As illustrated in FIG. 3C, a distance 320 between fingerprint slices 310H and 310I may be used to identify a relative location between fingerprint slices to authenticate the user. Other distances between other biometric print sensor data may be used as well. In these examples, the apparatus 100 may authenticate the user based on the relative locations. In some examples, the location data may include absolute locations (i.e., plus or minus a defined distance) at which a body part such as a finger or palm contacts the apparatus 100 while the apparatus is held. Such location data may include, for example, location data from the screen 220. In some examples, the angular incident information may indicate an angle at which a finger or palm is in contact with the apparatus 100. The angular incident information may be used to uniquely identify a particular way in which a user holds the apparatus 100, and may therefore be used to authenticate the user.

The pressure information may be based on a pressure sensor, which may be included in the screen 220, which may be a touchscreen. The pressure information may include a pressure-based PIN. For example, a user may enter a PIN code after holding the apparatus 100 and/or after biometric print sensor data authenticated by placing more pressure on a first finger, then a second finger, then a third finger, and then a fourth finger to input a PIN of 1-2-3-4. In this example, each finger may correspond to a portion of the PIN or other secret credential. In some examples, the pressure information may include combinations of finger pressure. For example, the user may apply more pressure for first and second fingers at the same time and apply pressure for the third finger and then the fourth pressure.

It should be noted that the foregoing may be subject to a threshold value. For example, the location information may be authenticated based on a threshold distance match between authenticated location data and current location data that indicates the location or spacing of fingers and/or other body parts while the apparatus 100 is being held. Likewise, the angular incident information may be authenticated based on a threshold angular value and the pressure information may be authenticated based on a threshold pressure value. Such use of thresholds may facilitate authentication without perfect matching. The threshold values may be predefined by a developer and/or configurable. In some examples, the threshold values may be based on a predefined and/or configurable error value.

The processor 102 may generate handholding information to reflect a hand configuration (such as the left-handed hand configuration 200A illustrated in FIG. 2A or the right-handed hand configuration 200B illustrated in FIG. 2B) based on the biometric print sensor data, the location data, and/or other information. The processor 102 may access the handholding information at various times, such as to generate handholding authentication data, obtain a current hand configuration to compare to the handholding authentication data, and/or at other times. The handholding authentication data may represent an authentic configuration in which the apparatus 100 is held by an authentic user, which may refer to a user for which handholding authentication data has been previously stored (such as in memory 110) for authenticating a user.

In some examples, the processor 102 may generate the handholding authentication data during a registration process. For example, during the registration process, the processor 102 may prompt a user to hold the apparatus 100, receive registration-based handholding information during the registration process, and generate the handholding authentication data based on the registration-based handholding information. In some examples, the prompt may include guidance information to the user that instructs the user to hold the apparatus 100 in a way that will be authenticated. Such guidance information may include visual cues through the screen 220, audio cues through an audio output device, and/or other types of instructions. For example, the guidance information may include an instruction to press harder (if a press is not detected), place finger(s) to a different location if the finger(s) aren't read (such as for non-whole-screen implementations), and/or other instruction to help the user to register handholding authentication data. At any rate, the handholding authentication data may be stored in a location accessible to the processor 102, such as in the memory 110. The process could include the user placing their hand(s) on the touch screen in order to get the full fingerprint all the way down to the hand along with the palm print.

In some examples, the processor 102 may generate the handholding authentication data based on machine-learning. For example, the processor 102 may observe hand configurations in which the authentic user holds the apparatus 100 over time, apply machine-learning to the observed hand configurations, and generate the previously-stored handholding authentication data based on the machine-learning. In one example, the machine-learning may employ linear regression techniques to correlate observed hand configurations (such as hand configurations 200A and 200B) with duration of time in which the hand configurations were maintained. In this sense, the linear regression or other machine-learning technique may build a model that may correlate hand configurations with an amount of time to output hand configurations that represent a way in which a user holds the apparatus 100. These machine-learned hand configurations may be stored as handholding authentication data. Similarly, in some examples, the processor 102 (based on instructions stored on a machine-readable medium that program the processor 102) may observe temperatures associated with the location of the plurality of simultaneous points of contact with the apparatus, apply machine-learning to the observed temperatures, generate the previously-stored handholding authentication data based on the machine-learning.

Returning to FIG. 1, the processor 102 may fetch, decode, and execute the instructions 112 to access handholding information indicating a hand configuration, such as a hand configuration 200 illustrated in FIGS. 2A-2C and 3, in which the apparatus 100 is being held.

The processor 102 may fetch, decode, and execute the instructions 114 to compare the handholding information with previously-stored handholding authentication data of an authentic user, the previously-stored handholding authentication data representing an authentic configuration in which the apparatus 100 is held by the authentic user.

The processor 102 may fetch, decode, and execute the instructions 116 to determine that the apparatus 100 is being held by the authentic user based on the comparison. In a particular example, the handholding information may include a plurality of fingerprint slices (such as fingerprint slices 310H and 310I illustrated in FIG. 3C and/or other fingerprint slices) that reflect the hand configuration, such as the hand configuration 200B illustrated in FIGS. 2B and 3C. The plurality of fingerprint slices may represent a plurality of fingers (such as fingers 201H and 201I and/or other fingers 201) simultaneously in contact with the apparatus 100 when the apparatus 100 is being held. Each fingerprint slice of the plurality of fingerprint slices may include minutiae information, friction ridge information, pore information, skin tone, and/or other biometric print data detected from a portion of a respective finger that is in contact with the apparatus 100 when the apparatus 100 is being held. The previously-stored handholding authentication data may include a plurality of authentication fingerprint slices that reflect the authentic configuration (such as determined during a registration process and/or machine-learning). In the foregoing example, to compare the handholding information with the previously-stored handholding authentication data, processor 102 may further determine whether each portion of each finger of the plurality of fingers is in contact with the apparatus 100 in the authentic configuration based on the plurality of fingerprint slices and the plurality of authentication fingerprint slices. For example, the processor 102 may generate a composite dataset based on the one or more of minutiae information, friction ridge information, skin tone, and/or pore information from the plurality of fingerprint slices, and determine a threshold number of the composite dataset based on the one or more of the minutiae information, friction ridge information, skin tone, and/or pore information matches the plurality of authentication fingerprint slices. For example, a given hand configuration may be associated with a set of biometric print features. Each biometric print feature may be based on detection of a respective body part. A threshold match may refer to a number of matches within the set of biometric print features for authentication. To illustrate, a given authentic configuration may have three fingerprint slices respectively having five, six, and seven biometric print features. A threshold match may require a certain number or percentage of matching biometric print features and/or a certain number or percentage of total matching biometric print features for the authentic configuration. In this manner, the apparatus 100 may tolerate some error in hand configuration input when authenticating a user.

In some examples, in addition to or instead of fingerprint slices, the handholding information may include a palm print slice (such as based on palm 203A or 203B illustrated in FIGS. 2A and 2B) representing a palm 203 in contact with the apparatus 100. In some examples, the palm print slice may be simultaneously in contact with the apparatus 100 with a plurality of fingers when the apparatus 100 is being held. The palm print slice may include minutiae information, friction ridge information, pore information, skin tone, and/ or other biometric print data detected and generated from a portion of the palm that is in contact with the apparatus 100 when the apparatus 100 is being held.

Likewise, in these examples, the previously-stored handholding authentication data may include an authentication palm print slice that further reflects the authentic configuration. In some of these examples, to compare the handholding information with the previously-stored handholding authentication data, the processor 102 may further determine whether the palm is in contact with the apparatus in the authentic configuration based on the palm print slice and the authentication palm print slice to determine whether the apparatus 100 is being held by the authentic user. For example, the processor 102 may determine whether the current palm print slice in the handholding information matches with the palm print slice from the handholding authentication data. Such match may include determining a number of matching biometric print features in the current palm print slice from the handholding information and the palm print slice from the handholding authentication data.

The processor 102 may fetch, decode, and execute the instructions 118 to cause an authenticated action to occur based on the determination. The authenticated action may include an on-board action that may occur at the apparatus 100 and/or off-board action that may occur remote from the apparatus 100. For example, the authenticated action may include an unlock operation in which the apparatus 100 is unlocked such from a secured, locked, state, an authorization to access a local file or application, and/or other on-board operations. In some examples, the authenticated action may include an authorization to access a remote application such as a logon to a website or other remote service and/or other off-board operations.

In some examples, the handholding information may further include location information indicating a plurality of locations at which each respective finger of the plurality of fingers contacts the apparatus 100 in the hand configuration. Likewise, the previously-stored handholding authentication data may include authentication location information that indicates a plurality of authentic locations associated with the authentic configuration. In these examples, to compare the handholding information with the previously-stored handholding authentication data, the processor may determine whether the plurality of locations corresponds with the plurality of authentic locations. For example, the processor may compare pixel locations of where the fingers touch the apparatus 100 (such as from a touchscreen such as the screen 220) of the handholding information and the handholding authentication data. Alternatively, or additionally, the processor may compare relative distance information between individual fingerprint slices or other biometric print data of the handholding information and the handholding authentication data.

In some examples, the previously-stored handholding authentication data comprises information that indicates a way in which the apparatus is being held by two hands of the authentic user. For example, the previously-stored handholding authentication data may include fingerprint slices and/or palm print slices from two hands of the user. In this example, a user may hold the apparatus 100 simultaneously with both hands in the authentic configuration in order for the apparatus to cause the authenticated action to occur.

In some examples, the previously-stored handholding authentication data further includes information indicating a switch from a first hand to a second hand for authentication. For example, the previously-stored handholding authentication data may include handholding information that is to be changed from a first handholding configuration (such as the left-handed hand configuration 200A illustrated in FIG. 2A) corresponding to the first hand to a second handholding configuration corresponding to a second hand (such as the right-handed hand configuration 200B illustrated in FIG. 2B) or vice versa. In this example, a user may hold the apparatus 100 with one hand in that hand's authentic configuration and then switch to holding the apparatus 100 with the other hand in that hand's authentic configuration in order for the apparatus to cause the authenticated action to occur. In some examples, an order of switching may be stored as handholding authentication data. For example, a right-to-left hand switch and vice versa may be stored as part of the handholding authentication data. In these examples, multiple switching may be used as well, such as right-to-left-right, and so forth, in which the number of hand switches may be further used for authentication.

In some examples, the apparatus 100 may store multiple sets of handholding authentication data. The multiple sets of handholding authentication data may correspond to a single user or one of the multiple sets of handholding authentication data may correspond to a first user while another one of the multiple sets of handholding authentication data may correspond to a second user. In either instance, the processor 102 may detect a change from the authentic configuration to a second hand configuration. The processor 102 may perform a security action responsive to the detected change in hand configuration. A security action may refer to an action that changes a state of the apparatus 100 in response to a potential security risk, such as when a user puts down the apparatus 100, hands over the apparatus to another user, or otherwise no longer holds the apparatus in the authentic configuration. The security action may include locking the apparatus, prompting to re-authenticate (through hand configurations or otherwise), and/or performing other action to secure the apparatus. For example, when an authentic configuration is detected, the apparatus 100 may periodically monitor whether the authentic configuration is maintained (such as through a background process that re-validates handholding information).

In addition to the above described handholding information, other types of handholding information may be used for the processes described herein. For example, non-contact finger/palm information that can be scanned by the biometric print sensor 104 (e.g. by taking a picture) may also be used as additional handholding information. By including non-contact scanning information to formulate a strong fingerprint/palm print, the user can be further identified.

Likewise, temperature information (another type of handholding information) may be used to detect if a real person is in contact with the biometric print sensor 104. Temperature information may also be used to identify a particular person. The temperature can be based on an ambient temperature taken by the apparatus 100. The ambient temperature would be used as a level that is compared to the actual temperature of the fingers/palm. The delta/ambient temperature is then fed into a machine learning algorithm that could then determine a predicted temperature of the user's fingers/palm over time in comparison to other users. Alternatively, the current ambient temperature may be determined based on the different fingers that are in contact with the apparatus (i.e., each user's fingerprint temperature has a delta in relation to the other fingers). In addition, a user may have different temperatures of each finger that can be learned over time that may be an input to the authentication process.

Other handholding information can be based on skin tone (which may include skin luminous). Each person's skin tone would have varying degrees of tone that can be used as an additional authentication factor.

Figure 4:
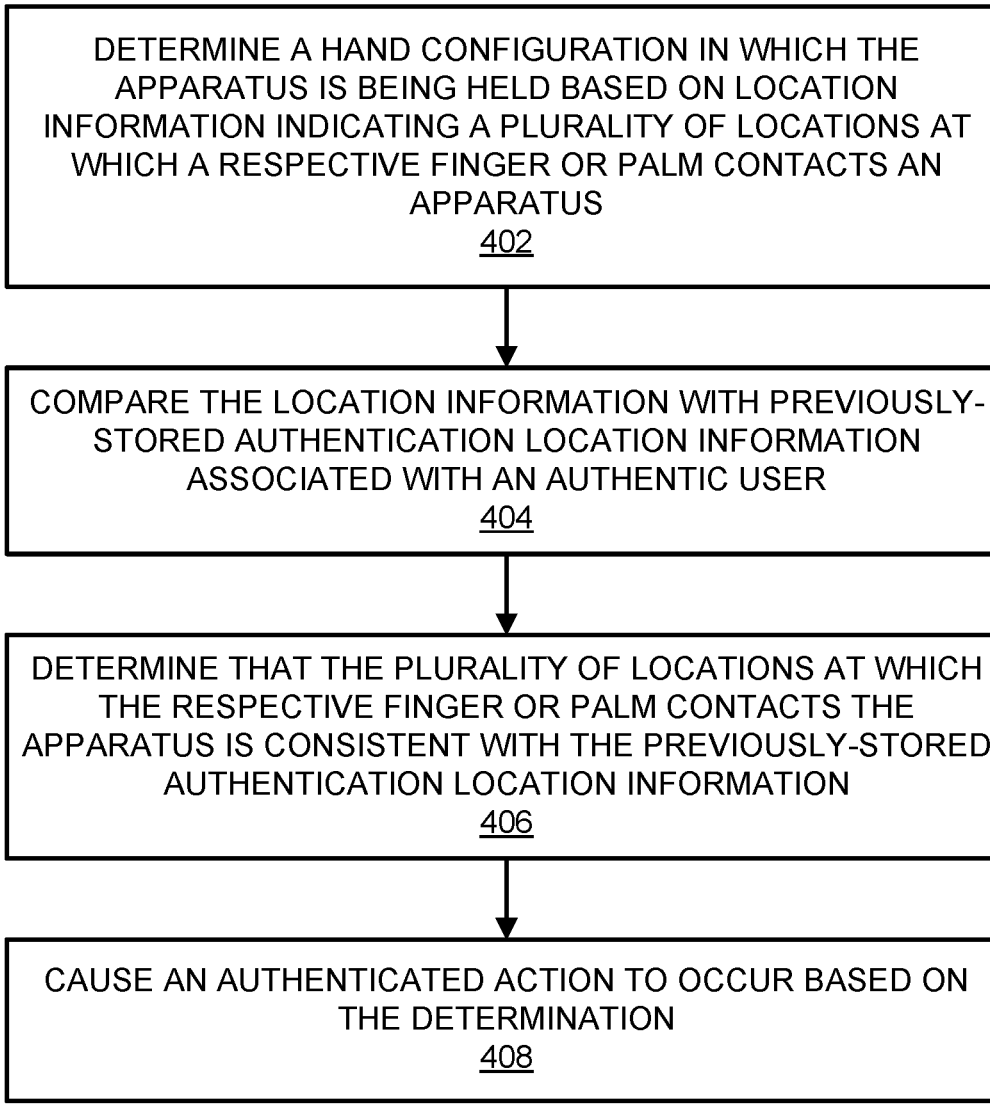
FIG. 4 depicts a flow diagram of an example method of authenticating a user based on handholding information.

Various manners in which the apparatus 100 may operate to authenticate a user based on handholding information are discussed in greater detail with respect to the method 400 depicted in FIG. 4. It should be understood that the method 400 may include additional operations and that some of the operations described therein may be removed and/or modified without departing from the scope of the method. The description of the method 400 may be made with reference to the features depicted in FIGS. 1, 2A-C, and 3 for purposes of illustration.

At block 402, the method 400 may include determining a hand configuration (such as a hand configuration 200A, 200B) in which the apparatus (such as apparatus 100) is being held based on location information indicating a plurality of locations at which a respective finger (such as finger 201) or palm (203) contacts the apparatus. In an example, determining the hand configuration may include accessing a first location at which a palm contacts the apparatus and a second location at which a finger contacts the apparatus, the first location and the second location being concurrently contacted.

In an example, determining the hand configuration may include accessing a first location at which a first finger contacts the apparatus and a second location at which a second finger contacts the apparatus, the first location and the second location being concurrently contacted. In this example, the first finger may correspond to a thumb, the first location and the second location are at opposing sides of the apparatus, and accessing the location information comprises accessing a third location at which a third finger contacts the apparatus, the third location being at an opposing side of the apparatus from the first location.

At block 404, the method 400 may include comparing the location information with previously-stored authentication location information associated with an authentic user.

At block 406, the method 400 may include determining that the plurality of locations at which the respective finger or palm contacts the apparatus is consistent with the previously-stored authentication location information.

At block 408, the method 400 may include causing an authenticated action to occur based on the determination.

In some examples, the method 400 may include performing a second-factor authentication that authenticates the authentic user based on second-factor authentication information different from the previously-stored authentication location information.

In some examples, the second-factor authentication may include accessing pressure input information indicating a level or sequence of applied pressure to the apparatus, and comparing the pressure input information to previously-stored authentication pressure information. The authenticated action to occur may be based further on the second-factor authentication.

In some examples, the second-factor authentication may include authenticating fingerprint slice information, palm print slice information, angular incident information that indicates an angle at which a finger or palm is in contact with the apparatus, voice information, facial information, and/or a predefined secret, wherein causing the authenticated action to occur is based further on the second-factor authentication.

In some examples, the second-factor authentication may include authenticating temperature (such as from a temperature sensor—not illustrated, but which may be incorporated with the biometric print sensor 104 in examples in which the biometric print sensor 104 is a temperature type of biometric print sensor or a separate temperature sensor) and/or skin tone information (such as based on a color and/or grayscale/black-and-white gradient photographic image).

Some or all of the operations set forth in the method 400 may be included as utilities, programs, or subprograms, in any desired computer accessible medium. In addition, the method 400 may be embodied by computer programs, which may exist in a variety of forms. For example, some operations of the method 400 may exist as machine-readable instructions, including source code, object code, executable code or other formats. Any of the above may be embodied on a non-transitory machine-readable (such as computer-readable) storage medium. Examples of non-transitory machine-readable storage media include computer system RAM, ROM, EPROM, EEPROM, and magnetic or optical disks or tapes. It is therefore to be understood that any electronic device capable of executing the above-described functions may perform those functions enumerated above.

FIG. 5 depicts a block diagram of an example non-transitory machine-readable storage medium 500 of authenticating a user based on handholding information.

The machine-readable instructions 502 may cause the processor (such as processor 102 illustrated in FIG. 1) to access handholding information, the handholding information indicating a location of a plurality of simultaneous points of contact with an apparatus indicative of a way in which the apparatus is being held. The machine-readable instructions 504 may cause the processor to compare the handholding information with previously-stored handholding authentication data. The machine-readable instructions 506 may cause the processor to determine a threshold match between the handholding information and the previously-stored handholding authentication data based on the comparison. The machine-readable instructions 508 may cause the processor to cause an authenticated action to occur based on the threshold match.

In some examples, the machine-readable storage medium 500 may store instructions that may distinguish different users based on handholding information and handholding authentication data. For example, the previously-stored handholding authentication data may be associated with a first user. The instructions stored at the machine-readable storage medium 500 may cause the processor to compare the handholding information with previously-stored second handholding authentication data associated with a second user, determine that the handholding information and the previously-stored second handholding authentication data do not match, and determine that the apparatus is not being held by the second user based on the determination that the handholding information and the previously-stored second handholding authentication data do not match. Thus, the instructions stored at the machine-readable storage medium 500 may cause the processor to determine that the second user is not holding an apparatus based on the handholding information (but may determine that the first user is holding the apparatus).

In some examples, different hand configurations (and/or locations at which fingers, palms, and/or other body parts) may be associated with different authenticated actions. For example, a first hand configuration may unlock the apparatus while a second hand configuration may provide access to a local or remote application. To illustrate, the authenticated action described above with respect to the machine-readable storage medium 500 may associated with a first application. The instructions stored at the machine-readable storage medium 500 when executed may cause the processor to access second location information indicating a second plurality of locations at which a second respective finger or the palm contacts the apparatus, compare the location information with previously-stored second authentication location information associated with the authentic user, determine that the plurality of locations at which the second respective finger or the palm contacts the apparatus is consistent with the previously-stored second authentication location information, cause a second authenticated action associated with a second application to occur based on the determination, the second authenticated action being different than the authenticated action. The first application in the foregoing example may refer to an unlock application that unlocks the apparatus and the second application may relate to a secured local or remote application that is unlocked by a second hand configuration and/or plurality of locations at which a body part contacts an apparatus.

Figure 6:
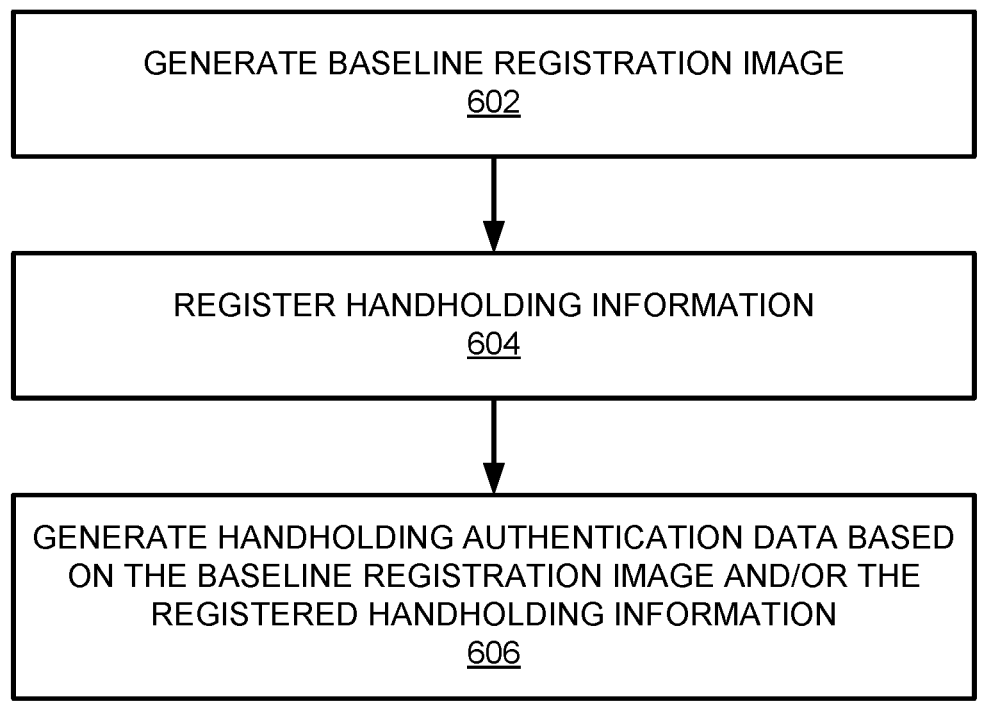
FIG. 6 depicts a flow diagram of an example method of registering a user via non-pad-based and pad-based registration.

Various manners in which the apparatus 100 may operate to register a user are discussed in greater detail with respect to the method 600 depicted in FIG. 6. It should be understood that the method 600 may include additional operations and that some of the operations described therein may be removed and/or modified without departing from the scope of the method. The description of the method 600 may be made with reference to the features depicted in FIGS. 1, 2A-C, and 3A-C for purposes of illustration.

At block 602, the method 600 may include generating a baseline registration image. For example, the apparatus 100 may prompt a user to place a palm and/or other portions of the hand (such as non-pad portions 201F (2,3) of a finger) at the screen 220, as shown in FIG. 3B. A biometric print sensor (such as the biometric print sensor 104 illustrated in FIG. 1) may generate the baseline registration image of the palm and/or other portions of the hand. In this manner, the baseline registration image may include non-pad-based biometric print features of the palm and/or other portions of the hand.

At block 604, the method 600 may include registering handholding information. For example, the apparatus 100 may prompt the user to hold the apparatus 100 in a handholding configuration (such as left-handed hand configuration 200A or right-handed hand configuration 200B) to be used for authentication. In some examples, the apparatus 100 may obtain the handholding information for registration instead, or in addition, by observing handholding configurations over of time. In either example, the apparatus 100 may detect biometric print features based on contact with the apparatus 100 that depends on the way in which the user holds the apparatus 100. The apparatus 100 may generate biometric print sensor data (fingerprints, fingerprint slices, palm prints, palm print slices, etc.).

At block 606, the method 600 may include generating handholding authentication data based on the baseline registration image and/or the registered handholding information. The method 600 may include storing the handholding authentication data to be matched for authentication.

Figure 7:
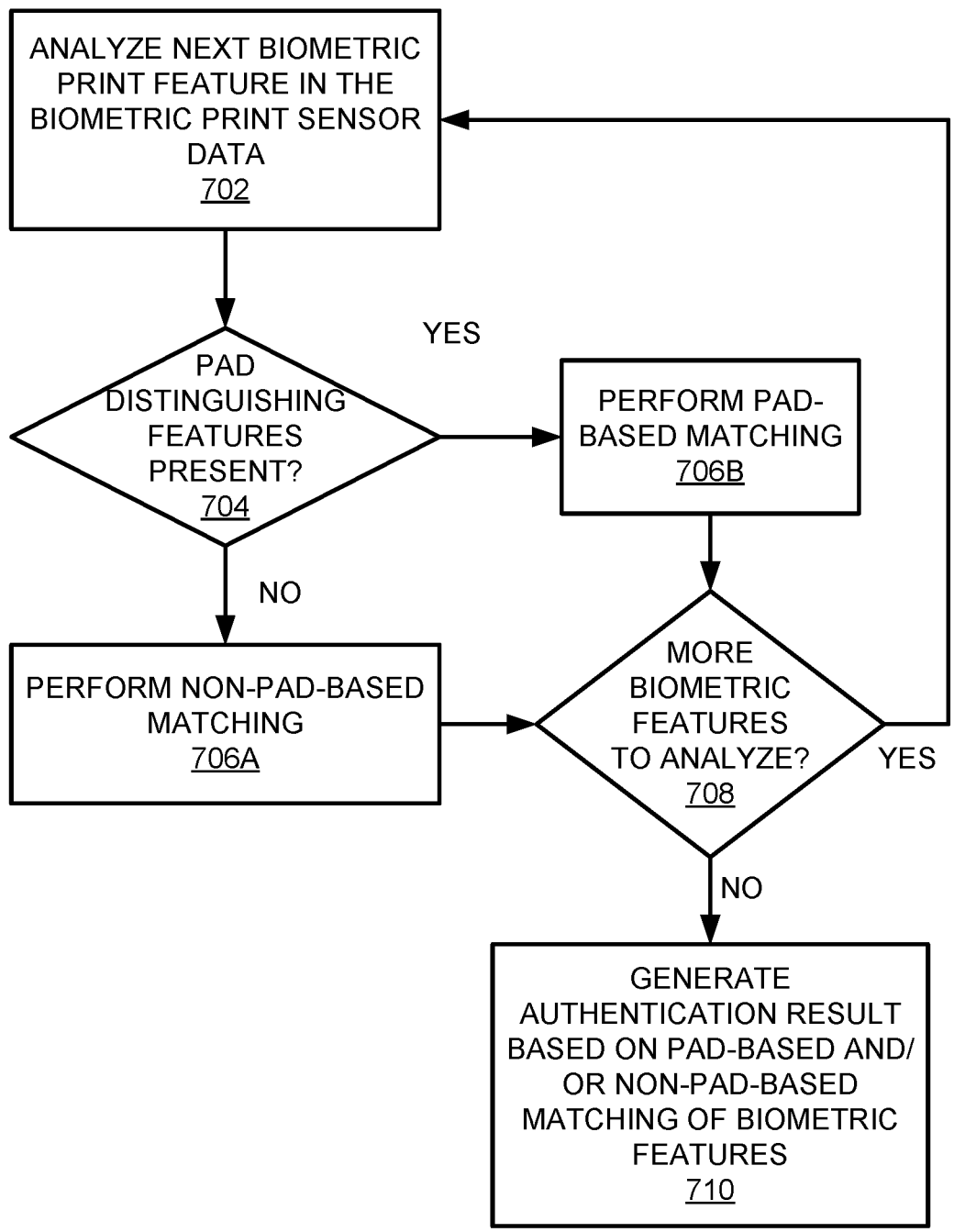
FIG. 7 depicts a flow diagram of an example method of matching based on a baseline registration image and/or pad-based registration information.

In examples that include the baseline registration image, the apparatus 100 may match biometric print slices against the baseline registration image for improved authentication of partial prints. For example, FIG. 7 depicts a flow diagram of an example method 700 of matching based on a baseline registration image and/or pad-based registration information. The method 400 may access handholding information that includes biometric print sensor data. The biometric print sensor data may encode data that identifies a plurality of biometric print features that are matched against biometric print features of previously-stored handholding authentication data to identify an authorized user who has been previously registered.

At block 702, the method 700 may include analyzing the next biometric print feature (from among the plurality of biometric print features) in the biometric print sensor data. At block 704, the method 700 may include determining whether pad-based biometric print features are present in the next biometric print feature. Pad-based biometric print features may refer to biometric print features that facilitate identification of a pad-based fingerprint, such as through identification of a core, or center of the pad-based fingerprint. Examples of pad-based biometric print features may include a whorl pattern, a loop pattern, a friction ridge pattern, and/or other pattern or features that may facilitate identification of a pad-based fingerprint.

At block 706A, the method 700 may include performing pad-based matching of the biometric print feature against the previously-stored handholding authentication data if the pad-based biometric print features are present. Pad-based matching may include minutiae-based matching (in which location and/or direction of minutiae points are compared), pattern-based matching (in which image patterns are compared), and/or other type of fingerprint matching techniques.

At block 706B, the method 700 may include performing non-pad-based matching of the biometric print feature against the previously-stored handholding authentication data if the pad-based biometric print features are not present. Non-pad-based matching may use the baseline registration image to orient and match biometric print features that may not otherwise be identifiable because they do not have pad-based biometric print features. As such, the method 700 may include using the baseline registration image as a baseline to identify biometric print features that lack pad-based biometric print features. This may improve an ability to identify biometric print features from portions of fingers other than the pad, palm prints, and/or other biometric print features that lack pad-based biometric print features. In some examples, the method 700 may manipulate the non-pad-based features and/or the baseline registration image to orient the two with respect to one another. For example, the method 700 may include iteratively flipping and/or rotating the baseline registration image until the biometric print features match or otherwise align to the baseline registration image and/or vice versa. Once a match is found, the manipulation may be used to further the handholding configuration. For example, the rotational angle and/or flipping may further indicate the handholding configuration.

At block 708, the method 700 may include determining whether there exist more biometric print features to analyze. If yes, the method 700 may return to block 702 to analyze the next biometric print feature. If not, at block 710, the method 700 may include generating an authentication result based on the pad-based and/or non-pad-based matching. For example, the method 700 may include quantifying a number of matches determined at block 706A,B and comparing the quantification to a threshold value. The method 700 may include authenticating (or not authenticating) the user based on the comparison.

It should be noted that the method 700 may be implemented as part of instructions 114 illustrated in FIG. 1, instructions 504 illustrated in FIG. 4, and/or other feature or operation in which a baseline registration image may be used to improve authentication based on biometric print slices such as fingerprint slices or palm print slices.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
   a processor; and
   a non-transitory machine-readable medium on which is stored instructions that when executed by the processor, cause the processor to:
   access handholding information indicating at least one hand configuration in which the apparatus is being held;
   compare the handholding information to previously-stored handholding authentication data of an authentic user, the previously-stored handholding authentication data including information indicating a specific order of switching from a first hand to a second hand in which the apparatus is held by the authentic user;
   determine that the apparatus is being held by the authentic user based on a determination that the handholding information matches the specific order of switching from the first hand to the second hand of the previously-stored handholding authentication data; and
   cause an authenticated action to occur based on the determination that the apparatus is being held by the authentic user.

2. The apparatus of claim 1, wherein the handholding information comprises a plurality of fingerprint slices that reflect the at least one hand configuration, the plurality of fingerprint slices representing a plurality of fingers simultaneously in contact with the apparatus when the apparatus is being held, each fingerprint slice of the plurality of fingerprint slices comprising one or more of minutiae information, friction ridge information, and pore information detected from a portion of a respective finger that is in contact with the apparatus when the apparatus is being held, and the previously-stored handholding authentication data comprises a plurality of authentication fingerprint slices that reflect an authentic configuration, and
   wherein to compare the handholding information with the previously-stored handholding authentication data, the instructions cause the processor to:
   determine whether each portion of each finger of the plurality of fingers is in contact with the apparatus in the authentic configuration based on the plurality of fingerprint slices and the plurality of authentication fingerprint slices.

3. The apparatus of claim 2, wherein to determine whether each portion of each finger of the plurality of fingers is in contact with the apparatus in the authentic configuration, the instructions cause the processor to:
   generate a composite dataset based on the one or more of minutiae information, friction ridge information, and pore information from the plurality of fingerprint slices; and
   determine a threshold number of the composite dataset based on the one or more of the minutiae information, friction ridge information and pore information matches the plurality of authentication fingerprint slices.

4. The apparatus of claim 2, wherein the handholding information comprises a palm print slice representing a palm simultaneously in contact with the apparatus with the plurality of fingers when the apparatus is being held, the palm print slice comprising the one or more of minutiae information, friction ridge information, and pore information detected from a portion of the palm that is in contact with the apparatus when the apparatus is being held, and the previously-stored handholding authentication data comprises an authentication palm print slice that further reflects the authentic configuration, and
   wherein to compare the handholding information with the previously-stored handholding authentication data, the instructions cause the processor to:
   determine whether the palm is in contact with the apparatus in the authentic configuration based on the palm print slice and the authentication palm print slice.

5. The apparatus of claim 2, wherein the handholding information further comprises location information indicating a plurality of locations at which each respective finger of the plurality of fingers contacts the apparatus in the at least one hand configuration, and the previously-stored handholding authentication data comprises authentication location information that indicates a plurality of authentic locations associated with the authentic configuration, and wherein to compare the handholding information with the previously-stored handholding authentication data, the instructions cause the processor to:
   determine whether the plurality of locations corresponds with the plurality of authentic locations.

6. The apparatus of claim 1, wherein the instructions cause the processor to:
   prior to comparing the handholding information to the previously stored handholding authentication data, detect that the handholding information includes information indicating a change from a first-hand configuration to a second-hand configuration.

7. The apparatus of claim 1, wherein the instructions cause the processor to:
   prompt, during a registration process, the authentic user to hold the apparatus;
   receive registration-based handholding information during the registration process; and
   generate the previously-stored handholding authentication data based on the registration-based handholding information.

8. The apparatus of claim 1, wherein the instructions cause the processor to:
   observe hand configurations in which the authentic user holds the apparatus over time;
   apply machine-learning to the observed hand configurations; and
   generate the previously-stored handholding authentication data based on the machine-learning.

9. The apparatus of claim 1, wherein the previously-stored handholding authentication data further comprises information that indicates a specific way in which the apparatus is being held by two hands of the authentic user.

10. The apparatus of claim 1, wherein the specific order of switching of the previously-stored handholding authentication data further includes information indicating an additional switch from the second hand to the first hand for authentication.

11. The apparatus of claim 1, wherein the previously-stored handholding authentication data further comprises: fingerprint slice information, palm print slice information, location information indicating a plurality of locations at which a respective finger or palm contacts the apparatus, skin tone information, temperature information, or angular incident information that indicates an angle at which a finger or palm is in contact with the apparatus.

12. A method, comprising:
determining, by a processor, handholding information indicating at least one hand configuration in which an apparatus is being held;
comparing, by the processor, the handholding information to previously-stored handholding authentication data associated with an authentic user, wherein the previously-stored handholding authentication data includes information indicating a specific order of switching from a first hand to a second hand by the authentic user;
determining, by the processor, that the apparatus is being held by the authentic user based on a determination that the handholding information matches the specific order of switching from the first hand to the second hand of the previously-stored handholding authentication data; and
causing, by the processor, an authenticated action to occur based on the determination that the apparatus is being held by the authentic user.

13. The method of claim 12, wherein determining the handholding information comprises:
accessing a first location at which a palm contacts the apparatus and a second location at which a finger contacts the apparatus, the first location and the second location being concurrently contacted.

14. The method of claim 12, wherein determining the handholding information comprises:
accessing a first location at which a first finger contacts the apparatus and a second location at which a second finger contacts the apparatus, the first location and the second location being concurrently contacted.

15. The method of claim 14, wherein the first finger corresponds to a thumb, the first location and the second location are at opposing sides of the apparatus, and determining the handholding information further comprises:
accessing a third location at which a third finger contacts the apparatus, the third location being at an opposing side of the apparatus from the first location.

16. The method of claim 12, further comprising:
performing, by the processor, a second-factor authentication that authenticates the authentic user based on second-factor authentication information different from the previously-stored authentication data, performing the second-factor authentication comprising:
accessing pressure input information indicating a level or sequence of applied pressure to the apparatus; and
comparing the pressure input information to previously-stored authentication pressure information, wherein causing the authenticated action to occur is based further on the second-factor authentication.

17. The method of 12, further comprising:
performing, by the processor, a second-factor authentication that authenticates the authentic user based on second-factor authentication information different from the previously-stored authentication data, wherein the second-factor authentication information includes voice information, facial information, or a predefined secret, wherein causing the authenticated action to occur is based further on the second-factor authentication.

18. A non-transitory machine-readable medium storing machine-readable instructions that when executed by a processor, cause the processor to:
access handholding information indicating at least one hand configuration in which an apparatus is being held;
compare the handholding information to previously-stored handholding authentication data, wherein the previously-stored handholding authentication data includes information indicating a specific order of switching from a first hand to a second hand by an authentic user;
determine that the apparatus is being held by the authentic user based on a determination that the handholding information matches the specific order of switching from the first hand to the second hand of the previously-stored handholding authentication data; and
cause an authenticated action to occur based on the determination that the apparatus is being held by the authentic user.

19. The non-transitory machine-readable medium of claim 18, wherein the authentic user includes a first user, the previously-stored handholding authentication data is associated with the first user, and the instructions when executed further cause the processor to:
compare the handholding information with previously-stored second handholding authentication data associated with a second user;
determine that the handholding information and the previously-stored second handholding authentication data do not match; and
determine that the apparatus is not being held by the second user based on the determination that the handholding information and the previously-stored second handholding authentication data do not match.

20. The non-transitory machine-readable medium of claim 18, wherein the authenticated action is associated with a first application, and wherein the instructions when executed further cause the processor to:
access second handholding information indicating a second plurality of locations at which a second respective finger or palm contacts the apparatus;
compare the second handholding information with previously-stored second authentication location information associated with the authentic user;
determine that the second handholding information matches the previously-stored second authentication location information; and
cause a second authenticated action associated with a second application to occur based on the determination that the second handholding information matches the previously-stored second authentication location information, the second authenticated action being different than the authenticated action.

21. The non-transitory machine-readable medium of claim 18, wherein the instructions when executed further cause the processor to:

observe temperatures associated with a plurality of simultaneous points of contact with the apparatus;
apply machine-learning to the observed temperatures, and generate the previously-stored handholding authentication data based on the machine-learning.

\* \* \* \* \*